Patented Dec. 26, 1944

2,365,753

UNITED STATES PATENT OFFICE 2,365,753

METHOD OF PRODUCING MOLDING COMPOUND

C. Roy Gleason and Robert Morse Small, Chicago, Ill., assignors to Sealkote Corporation, Chicago, Ill., a corporation of Delaware No Drawing. Application November 15, 1941, Serial No. 419,340

5 Claims. (Cl. 260—38)

This invention is directed to new and useful improvements in method of producing molding compounds and more specifically to resin-pulp compounds adapted for molding by heat and pressure, commonly referred to as thermosetting plastics.

This invention relates to a method of combining synthetic resins with strengthening agents such as wood pulp during the process of manufacturing the resins whereby the resins and strengthening agents are thoroughly mixed and the strengthening agents impregnated with the resins.

The primary object of this invention is to provide methods of producing molding compounds that are simple and inexpensive and whereby the resultant plastic will form a molded article of greater strength and at less cost than heretofore obtainable.

Another object is to provide a simple method of combining resins and strengthening agents or fillers and curing agents in a manner that permits accurate control of the relative proportions of each in the finished product and produces a quicker setting compound.

Still another object is to provide a method of combining resins and fillers or strengthening elements without requiring the use of emulsifying or cutting agents for the resins.

A still further object is to provide a method of producing a resin-pulp compound that, after formation, can be wetted and beaten to a moist pulp consistency and will run over paper making machines and be formed into paper or board form of desired thickness for use as such or for use in subsequent molding or laminating operations.

Still another object is to provide a method of combining resins with fillers in such a way that the resultant plastic does not contain undesired oils or elements that would tend to weaken the molded product.

Further objects and advantages of this invention will be apparent from the following detailed description.

Resins have heretofore been combined with wood flour and other fillers to be subsequently dried and pulverized and molded into various articles by means of heat and pressure.

The method usually employed has been to form the reaction product, drain off the top water, evaporate the remaining water and pour the resin into pans to cool and harden. The resin is broken up and a definite weight of it is taken and mixed with definite weights of fillers, color, and lubricant. Then this mass is put on a heated two roller mill and run at about 100° C. until the sheet forms and doesn't stick to the rolls anymore. Then the cure is added and mass reworked until uniformly mixed. It is removed from the roller mill, ground and screened to desired size.

Other attempts have been made to combine resins with fabrics or paper-like sheets for certain types of molding by impregnating the fabrics or sheets with the resins. Here the resin must be cut in solvents or emulsified and the fabrics or sheets wetted with the solution or emulsion. In some cases the impregnated sheets are then macerated or shredded for subsequent molding operations. Besides being expensive because of the use and loss of the solvents, accurate and efficient control of the amount of resin combined with such sheets is very difficult, if not impossible, because of the difference in the absorbent properties of the sheets being impregnated. The texture, size and thickness of the sheets and fabrics affect the amount of solution absorbed as does the length of time in which the sheets are bathed in the cut resin solution. Furthermore, if the solution stands for any length of time the solvent will evaporate and the solution will become heavier and of less wetting power. Thus it can be seen that control of the amount of resin combined with the sheets is extremely difficult. In some molding operations it is important that the percentage of resin in the sheets be definite and uniform and therefore it is important that the amount be accurately controlled.

Another fault in using emulsions of the resins for impregnating or mixing with the fillers is that the finished molding compound is apt to contain undesirable foreign matter that tends to weaken the finished molded product.

The use of fibrous materials in making the molding compound is desirable because of the added strength caused by the relatively long fibers interlocking with the resin and each other in the molding operation. It is therefore preferable to use wood pulp for example rather than wood flour. However, any pulp filler whether fibrous or not can be combined advantageously with the resinous material by the method herein described. If, however, sheets are to be formed it is necessary to use a fibrous filler.

The synthetic resins used in this new method of producing a molding compound are generally of the phenol-formaldehyde types and derivatives thereof although others may be used as will hereinafter be pointed out. As is well known in the art, such resins are reaction products of phenol and formaldehyde or similar chemicals subjected to heat which causes the phenol and formaldehyde to combine and to form a resinous product containing surplus water. This stage is referred to herein as the "water phase," the phase in which the resinous products contain more or less surplus wtaer. To complete the process the water must be removed and the liquid resin thoroughly cooled until solidified.

The subject of this invention is the method of combining the filler, wood pulp or the like being preferable, with the resin while the resin is hot and in the "water phase" above referred to and the filler is hot and moist.

Our early experiments demonstrated that it was highly unsatisfactory to attempt to combine resin that had been cut by solvents with wood pulp in water because of the added expense of the solvents that were lost completely and because of the fact that in attempting to mix the two in a beater the resin would coagulate, forming strings and balls, would stick to the blades and walls of the beater, would not mix well and the exact amount of resin combined with the pulp would not be known.

It was further discovered that it was unsatisfactory to pour resin in its water phase into pulp in water in a beater for the resin would throw out as it hit the cold beater water. Heating of the beater pulp water did not improve the situation and it was then that the following successful method was discovered.

The wood pulp or fibrous filler is beaten in water until the fibers open up and then the excess water is removed. Then the semi-wet pulp is carried to a heated mixer, heated to between 100° F. and 200° F., and kept in motion. To this is added the resin in its water phase, cooled down to about the same temperature as the pulp, and the mixer is run until the pulp and resin are thoroughly mixed. The arms of the mixer tend to press out the moisture from the fibers to allow the liquid resin to impregnate them.

A lubricant and plasticizer are added as the resin and pulp are mixed and when the mixing operation is complete, a curing agent such as hexamethylenetetramine is added and the mixing continued. The hexamethylenetetramine acts on the resin and creates a pre-setting state without being split into ammonia and formaldehyde and results in a molding compound which will set quicker under heat and pressure than do molding compounds produced under present methods.

Then the surplus liquid is removed and the wet mass thoroughly dried. It is then carried to a pulverizer and brought down to a flock of the size desired. The term "water phase" as herein used means that point in the manufacture of the synthetic resin when the reaction producing the resin has occurred, the resin being in syrup form and before the removal of the water. The resin in this stage is much easier to handle than after evaporation occurs and will pour, drain and mix with much less trouble.

More specifically the process is described as follows:

A definite weight of pulp (dry weight) is beaten in the regular type of beater as used in paper mills. This pulp can be either natural or bleached pulp and can be of any kind. If a cheap molding compound is desired, then of course the cheaper pulps should be used, such as ground wood. Wood flour or the like may be used if the greater strength produced by a fibrous filler is not needed. If wet laps are used, the dry weight must be determined.

When the pulp is sufficiently beaten and the fibers opened up, the excess water is taken off. We prefer to use the beaten pulp with a water content of about two water weight to one of pulp weight, but this can vary as much as from one water weight to two of pulp weight to one pulp weight up to three or four water weight.

This pulp is carried over into a mixer, preferably of the double arm type, steam jacketed, and preferably with a vacuum head. The pulp is heated to preferably 200° F. and kept in motion in the mixer. The temperature may, however, be as low as 100° F.

The resin to be used is then made or may be in the process of being made and for most kinds of molding purposes will be of the phenol-formaldehyde type, or derivatives or variations thereof. We have however been able to incorporate other types, such as alkyds, phenolic-alkyds, and various modifications of these and the term "synthetic resin" as used herein covers the types that are thermosetting and that pass through a "water phase," as above defined, in their production.

A typical phenol-formaldehyde formula is as follows: One mol of phenol (U. S. P. preferred)— one mol of formaldehyde—40%—$\frac{1}{10}$ cc. of hydrochloric acid as a catalyzer. The phenol-formaldehyde-acid mixture is heated under agitation until reaction at approximately 97° C. takes place. Heat is cut off and reaction allowed to continue for approximately 25 minutes at which time resin development is completed.

When the reaction product is finished it naturally is very hot, and the resin then starts to settle to the bottom of the container, so it is agitated and poured hot (preferably at approximately 200° F., but this can vary down to 100° F. or up to boiling temperature) into the mixer which is in operation and contains the beaten and heated moist pulp. The mixer is allowed to run until the pulp and resin are thoroughly mixed together. The resins which have a higher specific gravity than water have replaced the water in the fibers of the pulp. It will be noted that the resinous reaction product is used in its entirety, excess water (from the formaldehyde) and all. This mixing is accomplished in a few minutes during which time a plasticizer, a lubricant, and a curing agent are added and mixed therewith. A typical plasticizer is ethylene glycol, a typical lubricating agent is stearic acid, and a curing agent is hexamethylenetetramine. These naturally vary in amounts according to whether the molding compound is to be quick curing, the type of mold it is to be pressed in, and the flexibility desired.

The curing agent, preferably added after the plasticizer and the lubricant, combines with the resin in such a manner that the compound will set or cure faster than other plastics.

The mixer is then operated under its vacuum head a further time to take off part of the surplus water but none of the resin. Then the wet mass is treated mechanically to get rid of more of the water and to relieve the work to be done in making it bone dry in the vacuum dryer into which it is next placed. Various types of dryers can be used but a rotary type is preferable. It is rotated and dried under temperatures of under 200° F.

When thoroughly dried, it is carried over into a pulverizer and there brought down to the size desired. If further lubricant is desired it can be added to the pulp in the pulverizer.

The product is now ready for molding.

It can be used for filling the molds direct, or it can be premolded, or it can be wetted and used as any other pulp and formed into sheets of different weights and thicknesses on either cylinder or Fourdrinier paper making machines. In using the resin-pulp for making into paper, if it is to be subsequently used for molding purposes, care should be taken not to dry or calender it at temperatures over 200° F. but if it is to be cured and used as a finished resin-contained paper, it can be calendered at a temperature high enough to cure the resin. A feature of resin-pulp made this way is that it can be run over present day paper making machines freely and without sticking or gumming up the beaters or paper machines.

If set up in paper form—either heavy or light sheets—and not cured, it will replace much of the impregnated fabrics and papers that have been prepared by saturating the fabrics or paper in solvent cuts of the resins.

Thus it will be clear that the method comprises introducing the synthetic resin in its water phase, generally water and all, into a heated mixer containing pulp that has been beaten in water, part of the beater water removed, and the moist pulp heated. In this manner the resin and pulp are thoroughly worked together. In this hot state the pulp partially absorbs the hot resin and they combine well. The pulp having been beaten and opened up and much of the water having been extracted, it is more absorbent that it would be were it beaten dry or with all the water left in. Also in the hot state the mass remains plastic and easily workable. However, not enough heat is used to set up any curing action.

Many kinds of pulp may be used in producing these resin-pulp molding compounds, such as bleached and unbleached sulphite and sulphate as well as alpha pulp—singly and combined in various percentages. It is possible to use many other fibrous materials such as wool, wool lint, baggase, hemp, ramie, pita fibre, and practically any cellulose containing material. Most of these make a stronger molding compound when combined with resin by our methods. Some naturally have more value than others. Non-fibrous fillers or any inorganic matter, or wood flour may likewise be combined with resins or resin and pulp in the above manner advantageously and efficiently although the resultant molding compound will not produce articles of as great strength. We have also used ground wood pulp, waste papers, cotton and cotton linters trimmings, and various hulls such as oat, wheat, rice, etc. We prefer to use sulphite or sulphate pulp unless cost is the important factor, and in that case we prefer to use virgin ground wood pulp. The term "pulp" as herein used covers any of the above kinds or their equivalents.

A plastic compound formed by the method above described can be made having any desired percentage of resin.

A typical formula for producing such a compound having a 50 percent resin content now follows:

100 pounds dry weight of pulp filler is introduced in the beater and beaten with water as above described. When the excess water has been removed after the pulp has been sufficiently beaten to open up the fibers, it is carried to the jacketed mixer where it is heated, as described, and agitated or kneaded. This 100 pounds of wet pulp will, when carried to the mixer, in reality weigh 300 to 400 pounds because of its water content.

The typical synthetic resinous product which is added to this heated and agitated pulp is formed as follows:

94 pounds U. S. P. phenol, 42°, is added to 81 pounds 40 per cent formaldehyde and 45 cc. of hydrochloric acid 22° Baumé. This mixture is agitated in the kettle and heated to 97° C. and the heat is then shut off until the resin is formed. When the resin is formed the heat is again applied until the mass starts to boil and it is held at this temperature about ten minutes and then the heat is shut off, but the mass is kept under agitation. This mixture is then drained as soon as possible into the mixer containing the heated pulp and the resin and pulp are kneaded in the mixer for about 20 minutes. To this is then added one pound of ethylene glycol and two ounces of stearic acid, dry or cut in toluol. To this is then added and mixed three pounds hexamethylenetetramine. By adding the curing agent, hexamethylenetetramine, at this stage, it acts on the resin and creates a pre-setting state which produces a molding compound that will set quicker under heat and pressure than other resinous molding compounds.

When this is thoroughly dried and pulverized as above set forth a molding compound is formed having 50 per cent resin content.

If it is desired to form sheets from this compound it is placed in a paper machine beater where it is wetted and run through like ordinary paper pulp to form sheets of the desired thickness. If they are to be used as such the calendering temperature must be raised over 200° F. to cure the compound but if they are to be used for further molding operations care must be exercised to keep the temperature below 200° F.

We claim:

1. The method of producing a molding compound comprising beating a fibrous filler in water to open up the fibers thereof, removing the excess water therefrom, heating and kneading the moist filler at temperatures from 100° F. to 200° F., adding thereto hot material selected from the group of thermosetting synthetic resins which undergo a water phase in their formation, said addition being made while said material is in said water phase, kneading and mixing the hot ingredients until combined and thereafter drying and pulverizing the product so formed.

2. The method of producing a molding compound comprising beating fibrous pulp in water to open up the fibers thereof, removing a portion of the water content, heating and kneading the pulp, adding to the heated pulp while being kneaded hot liquid material selected from the group of thermosetting synthetic resins which undergo a water phase in their formation, said addition being made while said material is in said water phase and at a temperature approximating the temperature of the pulp, kneading and mixing the hot pulp and resinous product until the resin has replaced the water in the fibers of the pulp, drying and pulverizing.

3. The method of producing a molding compound comprising beating a fibrous pulp in water to separate the fibers thereof, removing therefrom the water until the pulp contains not less than one-half part of water to one part pulp and not more than four parts of water to one part pulp by weight, kneading the moist pulp and heating it to between about 100° F. and 200° F., adding thereto a resinous material selected from the group of thermosetting synthetic resins which undergo a water phase in their formation, said addition being made while said material is in said water phase and at from about 100° F. to 200° F., kneading the said material and pulp until mixed, removing the water therefrom, drying and pulverizing to the desired degree.

4. The method of producing a molding compound comprising beating a fibrous filler in water to open up the fibers, removing the excess water, kneading and heating said moist filler to between 100° F. and 200° F., adding thereto, a phenol-formaldehyde reaction product while partially reacted and in its water phase and heated to between 100° F. and boiling temperature, continuing the kneading until the liquid reaction product and the hot moist filler are well combined, drying and pulverizing to the desired size.

5. The method of producing a quick-acting thermosetting plastic compound comprising beating a fibrous filler in water to open up the fibers, removing the excess water, kneading and heating said moist filler to between 100° F. and 200° F., adding thereto while the kneading continues a phenol-formaldehyde reaction product while in its water phase and heated to between 100° F. and boiling temperature, adding stearic acid thereto as a lubricant and ethylene glycol as a plasticizer continuing the kneading until the said reaction product and the hot moist filler are well combined, removing surplus water therefrom, adding hexamethylenetetramine to the material during the kneading thereof, drying and pulverizing to the desired size.

C. ROY GLEASON.
ROBERT MORSE SMALL.

CERTIFICATE OF CORRECTION.

Patent No. 2,365,753.    December 26, 1944.

C. ROY GLEASON, ET AL.

It is hereby certified that error appears in the printed specification of the above numbered patent requiring correction as follows: Page 4, first column, line 16, claim 4, after "thereto," insert the words and comma --while kneading,--; and that the said Letters Patent should be read with this correction therein that the same may conform to the record of the case in the Patent Office.

Signed and sealed this 26th day of June, A. D. 1945.

Leslie Frazer
(Seal)    Acting Commissioner of Patents.

pulp by weight, kneading the moist pulp and heating it to between about 100° F. and 200° F., adding thereto a resinous material selected from the group of thermosetting synthetic resins which undergo a water phase in their formation, said addition being made while said material is in said water phase and at from about 100° F. to 200° F., kneading the said material and pulp until mixed, removing the water therefrom, drying and pulverizing to the desired degree.

4. The method of producing a molding compound comprising beating a fibrous filler in water to open up the fibers, removing the excess water, kneading and heating said moist filler to between 100° F. and 200° F., adding thereto, a phenol-formaldehyde reaction product while partially reacted and in its water phase and heated to between 100° F. and boiling temperature, continuing the kneading until the liquid reaction product and the hot moist filler are well combined, drying and pulverizing to the desired size.

5. The method of producing a quick-acting thermosetting plastic compound comprising beating a fibrous filler in water to open up the fibers, removing the excess water, kneading and heating said moist filler to between 100° F. and 200° F., adding thereto while the kneading continues a phenol-formaldehyde reaction product while in its water phase and heated to between 100° F. and boiling temperature, adding stearic acid thereto as a lubricant and ethylene glycol as a plasticizer continuing the kneading until the said reaction product and the hot moist filler are well combined, removing surplus water therefrom, adding hexamethylenetetramine to the material during the kneading thereof, drying and pulverizing to the desired size.

C. ROY GLEASON.
ROBERT MORSE SMALL.

CERTIFICATE OF CORRECTION.

Patent No. 2,365,753.    December 26, 1944.

C. ROY GLEASON, ET AL.

It is hereby certified that error appears in the printed specification of the above numbered patent requiring correction as follows: Page 4, first column, line 16, claim 4, after "thereto," insert the words and comma --while kneading,--; and that the said Letters Patent should be read with this correction therein that the same may conform to the record of the case in the Patent Office.

Signed and sealed this 26th day of June, A. D. 1945.

(Seal)

Leslie Frazer
Acting Commissioner of Patents.